US00RE49979E

(19) United States
(12) Reissued Patent
Bergqvist

(10) Patent Number: US RE49,979 E
(45) Date of Reissued Patent: May 21, 2024

(54) METHOD FOR GENERATING A 3D COMBINED MODEL THAT REPRESENTS A SCENE

(71) Applicant: FARO Technologies Sweden AB, Mölndal (SE)

(72) Inventor: Göran Bergqvist, Lindome (SE)

(73) Assignee: FARO Technologies Sweden AB, Mölndal (SE)

(21) Appl. No.: 17/542,619

(22) Filed: Dec. 6, 2021

Related U.S. Patent Documents

Reissue of:
(64) Patent No.: 10,508,915
Issued: Dec. 17, 2019
Appl. No.: 16/091,642
PCT Filed: Mar. 28, 2017
PCT No.: PCT/SE2017/050297
§ 371 (c)(1),
(2) Date: Oct. 5, 2018
PCT Pub. No.: WO2017/176191
PCT Pub. Date: Oct. 12, 2017

(30) Foreign Application Priority Data

Apr. 6, 2016 (SE) ..... 1630076

(51) Int. Cl.
*H04N 13/282* (2018.01)
*G01C 15/00* (2006.01)
(Continued)

(52) U.S. Cl.
CPC ..... *G06V 10/225* (2022.01); *G01C 15/00* (2013.01); *G01C 15/002* (2013.01); *G06T 17/05* (2013.01);
(Continued)

(58) Field of Classification Search
CPC .... G01C 15/002; G01C 15/00; H04N 13/282; H04N 13/275; G06V 20/64; G06V 10/225; G06V 2201/121; G06T 17/05; G06T 17/10
See application file for complete search history.

(56) References Cited

U.S. PATENT DOCUMENTS 4,964,218 A 10/1990 Morghen
8,855,442 B2 10/2014 Owechko
(Continued)

FOREIGN PATENT DOCUMENTS

CA 2893257 A1 9/2015
CN 103673998 A 3/2014
(Continued)

OTHER PUBLICATIONS

Alba, Mario Ivan et al., "Mapping Infrared Data on Terrestrial Laser Scanning 3D Models of Buildings" Remote Sens. 2011, vol. 3, pp. 1847-1870.
(Continued)

*Primary Examiner* — Christina Y. Leung
(74) *Attorney, Agent, or Firm* — McCarter & English, LLP; Dave S. Christensen

(57) ABSTRACT

A method for generating a 3D combined model that represents a scene includes acquiring the coordinates in an external geodetic frame, acquiring at least one 3D primary model representing the scene, which model includes primary model elements, oriented in the geodetic frame. The primary model elements are assigned measured primary physical property values in the form of coordinates in a local three-dimensional coordinate system of the corresponding point. The method further includes generating a 3D secondary model representing the scene, wherein at least some secondary model elements are assigned coordinates in the local coordinate system and at least one secondary physical property value. At least some secondary model elements are assigned coordinates in the external geodetic frame. The primary and at least one secondary model are then combined. Also disclosed are a related system and reference members for use in the system.

11 Claims, 4 Drawing Sheets

(51) Int. Cl.

| | |
|---|---|
| ***G06T 17/05*** | (2011.01) |
| ***G06T 17/10*** | (2006.01) |
| ***G06V 10/22*** | (2022.01) |
| ***G06V 20/64*** | (2022.01) |
| ***H04N 13/00*** | (2018.01) |
| ***H04N 13/275*** | (2018.01) |

(52) U.S. Cl.

CPC ..... *G06T 17/10* (2013.01); *G06V 20/64* (2022.01); *H04N 13/275* (2018.05); *H04N 13/282* (2018.05); *G06V 2201/121* (2022.01)

(56) References Cited

U.S. PATENT DOCUMENTS

| | | | | |
|---|---|---|---|---|
| 9,921,048 | B2 | 3/2018 | Murata et al. | |
| 9,940,727 | B2 * | 4/2018 | Medioni | G01B 11/245 |
| 10,508,915 | B2 | 12/2019 | Bergqvist | |
| 2012/0206716 | A1 * | 8/2012 | Cramer | G01S 7/497 356/614 |
| 2013/0097880 | A1 | 4/2013 | Wernig et al. | |
| 2014/0098382 | A1 * | 4/2014 | Bridges | G01C 15/002 356/614 |
| 2014/0210856 | A1 * | 7/2014 | Finn | G01C 15/002 345/633 |
| 2015/0240987 | A1 | 8/2015 | DesJardien et al. | |
| 2016/0071318 | A1 * | 3/2016 | Lee | G06T 17/00 345/419 |
| 2016/0189433 | A1 * | 6/2016 | Dayde | G06T 19/20 345/419 |
| 2017/0091993 | A1 * | 3/2017 | Andrew | G06F 3/04812 |
| 2017/0256097 | A1 * | 9/2017 | Finn | G06T 7/73 |
| 2019/0120621 | A1 | 4/2019 | Bergqvist | |
| 2019/0178643 | A1 * | 6/2019 | Metzler | G01C 11/025 |

FOREIGN PATENT DOCUMENTS

| | | | |
|---|---|---|---|
| CN | 203837656 | U | 9/2014 |
| CN | 204269119 | U | 4/2015 |
| CN | 104792322 | A | 7/2015 |
| EP | 2660777 | A2 | 11/2013 |
| JP | 2002181541 | A | 6/2002 |
| SE | 1630076 | A1 | 11/2017 |
| WO | 2014162344 | A1 | 10/2014 |
| WO | 2015045020 | A1 | 4/2015 |
| WO | 2017176191 | A1 | 10/2017 |

OTHER PUBLICATIONS

European Office Action for Application 17779435.1 dated Mar. 11, 2021; 4 pgs.

European Search Report for Application No. 17779435.1 dated Nov. 18, 2019; 10 pgs.

Kersten, "3D Scanning and Modelling of the Bismarck Monument by Terrestrial Laser Scanning for Integration into a 3D City Model of Hamburg", Digital Heritage, Third International Euro-Mediterranean Conference, EuroMed 2010, vol. 6436, pp. 179-192.

Yun et al., "Automated registration of multi-view point clouds using sphere targets", Advanced Engineering Informatics, 2015, pp. 930-939, vol. 29, No. 4.

Becerik-Gerber et al., "Assessment of target types and layouts in 3D laser scanning for registration accuracy", Automation in Construction, 2010, pp. 649-658, vol. 20, No. 5.

Rikke et al. "Thermal cameras and applications: a survey", Machine Vision and Applications, 2014, pp. 245-262 vol. 25, No. 1, pp. 245-262.

Kim et al., "Multi-modal big-data management for film production", 2015 IEEE International Conference on Image Processing (ICIP), 2015, pp. 4833-4837.

Chae et al., "A 3D surface modeling system for intelligent excavation system", Automation in Construction, 2011, pp. 808-817, vol. 20, No. 7.

Borrmann et al., "Mutual Calibration for 3D Thermal Mapping", 10th IFAC Symposium on Robot Control International Federation of Automatic Control (SYROCO '12), 2012.

International Search Report and Written Opinion, dated May 30, 2017, from corresponding PCT application No. PCT/SE2017/050297.

* cited by examiner

METHOD FOR GENERATING A 3D COMBINED MODEL THAT REPRESENTS A SCENE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

SUBJECT OF THE INVENTION

The invention relates to a method for generating a 3D combined model that represents a scene, in which scene base members are attached to scene elements and wherein each base member is associated with a respective reference point. The method comprises the steps of acquiring the coordinates in an external geodetic frame of said reference points, detachably connecting reference members comprising primary means to said base members in predetermined positional relationships, and acquiring at least one 3D primary model that represents the scene, which 3D primary model comprises a plurality of primary model elements, some of which represent points on the scene elements and some of which represent points on said primary means, wherein each primary model element is assigned measured primary physical property values in the form of coordinates in a local three-dimensional coordinate system of the corresponding point.

The invention also relates to a system for use in said method for generating a 3D combined model that represents a scene. The system comprises a plurality of base members, wherein each base member defines a reference point, which base members are adapted to be connected to scene elements, a plurality of first reference members each comprising a first connecting portion adapted to cooperate with a second connecting portion of a base member to detachably connect the first reference member to said base member in a predetermined positional relationship, and wherein each first reference member comprises a primary means with a recognisable appearance.

The invention also relates to a first reference member for use in the above system, which first reference member comprises a first connecting portion adapted to cooperate with a second connecting portion of a base member to detachably connect the first reference member to the base member in a predetermined positional relationship, and a primary means with a detectable, recognisable appearance.

BACKGROUND OF THE INVENTION

It is known to use a 3D scanner and base members and interchangeable reference members to create a 3D model that represents a scene, e.g. the inside of a factory or a room in a nuclear power plant. The base members are attached to scene elements (walls, floors, ceilings etc.) and the first reference members, e.g. 3D reference spheres, are detachably connected to the base members before the 3D scanning is carried out. The first reference members have a recognisable appearance that makes it easy to identify the model elements that represent surfaces of the reference members. The first reference members are attached to the base members by means of corresponding connecting portions that ensure that the positional relationship between a base member and a reference member attached thereto is always the same. Each base member is further associated with a respective reference point and the known positional relationship between each base member and its corresponding first reference member makes it possible to use the model elements generated by the reference members to generate corresponding model elements in the point cloud that correspond to said reference points.

It is also known to determine the coordinates in an external geodetic frame of the reference points of the base members. This can, for example, be achieved by means of standard surveying equipment, e.g. a total station, and one or more reference members, e.g. prisms or reflectors, adapted to be connected to the base members in predetermined positional relationships.

Thus it becomes possible to not only generate an accurate 3D model that represents the scene but also to associate the 3D model with coordinates in the external geodetic frame.

This method may, for example, be used to generate a point cloud that represents a building or a part of building and this information, suitably stored in a database, can be accessed to construct an identical copy of the building at a different location.

The 3D model generated with the above described, known method can be used to determine the positions of the scene elements but does not reveal any information about other characteristics of the scene elements.

OBJECT OF THE INVENTION

A first object of the invention is to provide a method for generating a 3D model that represents a scene, wherein at least some model elements are assigned coordinates in a local coordinate system and at least one secondary physical property value, and wherein at least some model elements are assigned coordinates in an external geodetic frame.

A second object of the invention is to provide a system for use in such a method.

A third object of the invention is to provide a first reference member for use in said system.

DEFINITIONS

A physical property is any measureable property whose values describe a state of a physical system. Examples of physical properties are location, temperature, volume and colour.

One primary physical property of an object is herein defined as the coordinates in a local coordinate system of said object.

A secondary physical property of an object is herein defined as any suitable and measureable physical property in addition to the coordinates in a local or external coordinate system of said object.

A reference point associated with a base member has a known position in relation to the base member. The reference point may be located within, without or on a surface of the base member. The reference point is suitably located on a surface and at the centre of said base member.

A geodetic frame is a coordinate system, and a set of control points, used to locate places on the Earth. A geodetic frame may be global as well as local. Examples of geodetic frames are SWEREF (the Swedish national geodetic frame) and ETRS89 (a European geodetic frame).

A model refers to a 2D or 3D representation of a scene comprising scene elements. A model consists of a plurality of model elements associated with points (specific positions in 2D or 3D) within the scene. These model elements can be assigned one or more physical property values, e.g. coordinates, temperature and colour.

A primary model is a 3D model wherein each primary model element at least is assigned primary physical property values in the form of coordinates in a local three-dimensional coordinate system.

A secondary model is a 2D or 3D model wherein each secondary model element at least is assigned one or more secondary physical property values.

A 3D combined model is a combination of at least one primary model and at least one secondary model, wherein each combined model element is assigned primary and secondary physical property values.

A reference member is a device that is adapted to be connected to a base member and comprises one or more means adapted to interact with a device to generate recognizable physical property values. Said means may be active and adapted to emit a recognizable signal, to emit a physical property to be detected (e.g. light or sound of a specific wavelength or modulation) or passive and adapted to reflect a signal (e.g. light or sound of a specific wavelength or modulation) emitted by an apparatus. A passive means may have a specific appearance, dimensions or other characteristic that makes the reflected signals easy to identify.

A first reference member comprises at least one primary means and may also comprise one or more secondary means.

A second reference member comprises at least one secondary means but no primary means.

Primary means are adapted to provide primary physical property values that can be used to identify corresponding reference members.

Secondary means are adapted to provide secondary physical property values that can be used to identify corresponding reference members.

A surveying reference members comprises a surveying means that can be used to determine the coordinates of a reference point of a corresponding base member.

An object arranged in a predetermined positional relationship in relation to another object has a reference point arranged in a predetermined position in relation to a reference point of the other object. The orientation of said objects may vary as long as the positional relationship between the reference points remains the same.

SUMMARY OF THE INVENTION

The first object of the invention is achieved with the initially described method, which method further comprises the steps of acquiring at least one secondary model that represents the scene, which secondary model comprises a plurality of secondary model elements, some of which represent points associated with the scene elements and some of which represent points associated with secondary means connected to the reference members in predetermined positional relationships, wherein each secondary model element is associated with at least one measured secondary physical property value associated with the corresponding point, and processing the acquired information to generate a 3D combined model that represents the scene, wherein at least some combined model elements are associated with known coordinates in the external geodetic frame, and wherein at least some combined model elements are associated with both first and second physical property values.

The 3D primary model comprises primary model elements and each primary model element corresponds to a point on a surface of a scene element or a primary means. Each primary model element is assigned measured primary physical property values in the form of the coordinates in the local three-dimensional coordinate system of the corresponding point. The primary means has a recognizable appearance that makes the corresponding primary model elements easy to identify.

The secondary means form part of first or second reference members attached to the base members. The apparatus registers a plurality of secondary physical property values acquired from the secondary means and the scene elements. These values are assigned to corresponding secondary model elements. The values associated with the secondary means are known and can be used to identify corresponding secondary model elements.

Because the positional relationship between a reference member and its corresponding base member, or more specifically between a reference point of the reference member and the reference point of the base member, is known, it is now possible to project the secondary model onto the 3D primary model. The result is a 3D combined model that represents the scene and wherein both first and second physical property values are assigned to each combined model element. A value assigned to a primary or second model element may be assigned to a combined model element if the combined model element is associated with the same point within the scene as the primary or secondary model element. It is also possible to determine the value to be assigned to a combined model element from values assigned to primary or second model elements associated with points within the scene adjacent to the point associated with the combined model element. Additionally, coordinates in the external geodetic frame are assigned to at least some combined model elements. This 3D combined model allows a user to generate an accurate 3D image of the scene, which 3D image reveals at least one secondary physical property of the scene and has known coordinates in the external geodetic frame.

The predetermined positional relationship between a reference member and a base member is achieved by means of cooperating first and second connecting portions on the reference member and the base member, respectively.

The 3D primary model is advantageously acquired by means of a 3D scanner adapted to send and receive laser signals that are reflected by the primary means of the first reference members.

The secondary model can be acquired by means of any suitable type of apparatus. For example, a thermal imaging camera can be used to measure the temperature of the secondary means and the scene elements, and a camera using visible light can be used to determine the colour of the secondary means and the scene elements.

The apparatus and the 3D scanner can be housed in a single unit or be separate units.

The step of acquiring a secondary model can be repeated for different types of secondary physical properties, so that a plurality of secondary models are generated, each related to a specific type of secondary physical property.

An apparatus may be adapted to measure one or more than one type of physical properties, and a secondary model may comprise information relating to one or more than one type of physical properties.

The method may comprise the step of replacing some or all first reference members with second reference members comprising secondary means before a secondary model is acquired. The second reference members are detachably attached to their corresponding base members in a predetermined positional relationship. This step may be executed once or several times and makes it possible to use second reference members with different types of secondary means adapted to provide different types of physical property values.

It is also possible to use first reference members that comprise both a primary and a secondary means. This embodiment is advantageous in that it reduces the total number of reference members and thus the costs associated therewith.

Examples of suitable types of secondary physical properties to be acquired from the secondary means are: colour, frequency, luminescence, magnetic field, reflectivity, temperature and volume.

A reference member may comprise means of the passive (reflective) type and/or means of the active (emitting type). A passive means may, for example, have a recognisable shape, volume, colour or reflectivity. Examples of reference members comprising passive means are prisms and reflectors (for use with surveying equipment) and reference spheres (for use with a 3D scanner). An active means may be adapted to emit a recognisable signal, for example light or sound of known wavelengths. An example of reference members comprising active means are light emitting diodes.

The method may also comprise the steps of detachably connecting one or more surveying reference members, which surveying reference members comprise surveying means for use with surveying equipment, to at least two base members in predetermined positional relationships by means of cooperating first and second connecting portions, and acquiring the coordinates in the external geodetic frame of the reference points associated with said base members by means of said surveying equipment and said one or more surveying reference members. The coordinates of the reference points are determined one at a time, which makes it possible to use a single surveying reference member for determining the coordinates of more than one reference point.

The method may also comprise the step of attaching the base members to the scene elements. However, it is also possible to use base members that are already attached to the scene elements.

The fact that at least two reference points have known coordinates in the external geodetic frame is advantageous because scene elements are not always located in their originally assigned positions. Scene elements are sometimes incorrectly positioned and they can be moved intentionally or unintentionally during normal use. The invention thus allows a user to create an accurate and up-to-date 3D combined model of a scene. The invention also allows a user to accurately combine existing 3D combined models, e.g. of existing buildings, into even larger 3D combined models that show exactly what such a combination would look like in real life.

Note that the various steps of the method do not have to be executed in the above described order. It is, for example, possible to acquire the secondary model before the 3D primary model is acquired.

Reference members are advantageously interchangeable with other reference members comprising the same type of first and/or secondary means. Interchangeable reference members share at least some features and provide identical results when used.

The second object of the invention is achieved with the initially described system, which system further comprises secondary means adapted to provide at least one recognisable secondary physical property value, which secondary means are adapted to be connected to said base members in predetermined positional relationships. This system makes it possible to generate a 3D combined model wherein at least some combined model elements are associated both with coordinates in the local three-dimensional coordinate system and a secondary physical property value, which 3D combined model has known coordinates in the external geodetic frame.

A recognisable physical property value is a known value that is easy to identify among other physical property values acquired from scene elements.

A first reference member may comprise both first and secondary means.

Alternatively, the system may comprise second reference members, each comprising a first connecting portion adapted to cooperate with the second connecting portion of the base member to detachably connect the second reference member to the base member in a predetermined positional relationship, wherein each second reference member comprises a secondary means.

The cooperating portion of the base member may be adapted to cooperate with a first connecting portion of a surveying reference member, e.g. a prism or a reflector, which surveying reference member comprises a surveying means adapted to cooperate with surveying equipment, e.g. a total station, to detachably connect said surveying reference member to the base member in a predetermined positional relationship, which surveying means can be used to determine the coordinates in the external geodetic frame of the reference point of the base member. This embodiment allows a user to determine the coordinates in the external geodetic frame of the reference points by means of standard surveillance equipment, e.g. a total station.

The secondary means is suitably adapted to provide at least one recognisable secondary physical property value of at least one of the following types: colour, frequency, luminescence, magnetic field, reflectivity, temperature and volume.

The third object of the invention is achieved with the initially described first reference member, which comprises a secondary means adapted to provide at least one type of secondary physical property value.

Any secondary physical property value provided by a secondary means should be recognisable and easy to identify among the many values associated with the scene elements.

Any information associated with a base member, e.g. coordinates of the corresponding reference point, information about the scene element that the base member is attached to, identification number for the base member etc., may be stored in a data storage means arranged within the base member. The data storage means is suitably adapted to communicate said information to other devices, e.g. a 3D scanner, a RFID reading apparatus or a smart phone. The base member may, for example, comprise an RFID member comprising an RFID tag.

The reference members may also comprise reading means for reading data stored in the data storage means in a base member. The reading means are suitably arranged to be able to communicate the read information to external measuring or data processing devices like 3D scanners or RFID reading apparatuses which comprise communicating means, adapted to communicate with such reference members. For this reason such reference member may comprise an electrical power cell, which can also be used for other purposes, like powering a light source.

A data processing means adapted to process the information acquired from the reference members and the scene elements may be arranged within the 3D scanner or any apparatus adapted to measure a physical property within the scene. It is also possible to use a separate data processing means connected to said 3D scanner and apparatuses. Said connection may be a wired or wireless connection.

The method, system and first reference member according to the invention are also advantageous in that they can be employed for many different purposes within a wide variety of fields.

In one embodiment, the base members and reference members are attached to parts of a building and are used to generate a 3D combined model that accurately represents the scene elements and reveals temperature variances within the scene. This information can be useful when a user wants to locate a specific heat source (e.g. a pipe within a wall or malfunctioning equipment) or wants to locate the source of heat losses in a building.

In another embodiment, the base members are fixed to the ground and reference members attached thereto comprise means adapted to interact with a scanning apparatus that can be used to reveal the position of, for example, objects in the ground (such as pipes and archaeological deposits) or mineral depositions.

The method can also be used to detect changes over time. Equipment is sometimes moved from one part of a factory to another part, walls are raised and torn down, a landscape changes, oil tanks are filled and emptied etc. and these are changes that can be detected and registered by means of the invention.

DRAWINGS

Embodiments of the invention will now be described in detail with reference to the drawings, wherein.

DETAILED DESCRIPTION

The invention will now be described with reference to the accompanying drawings, wherein like characters denote like or corresponding parts. Some details may have been removed from the drawings for the sake of clarity.

Figure 1:
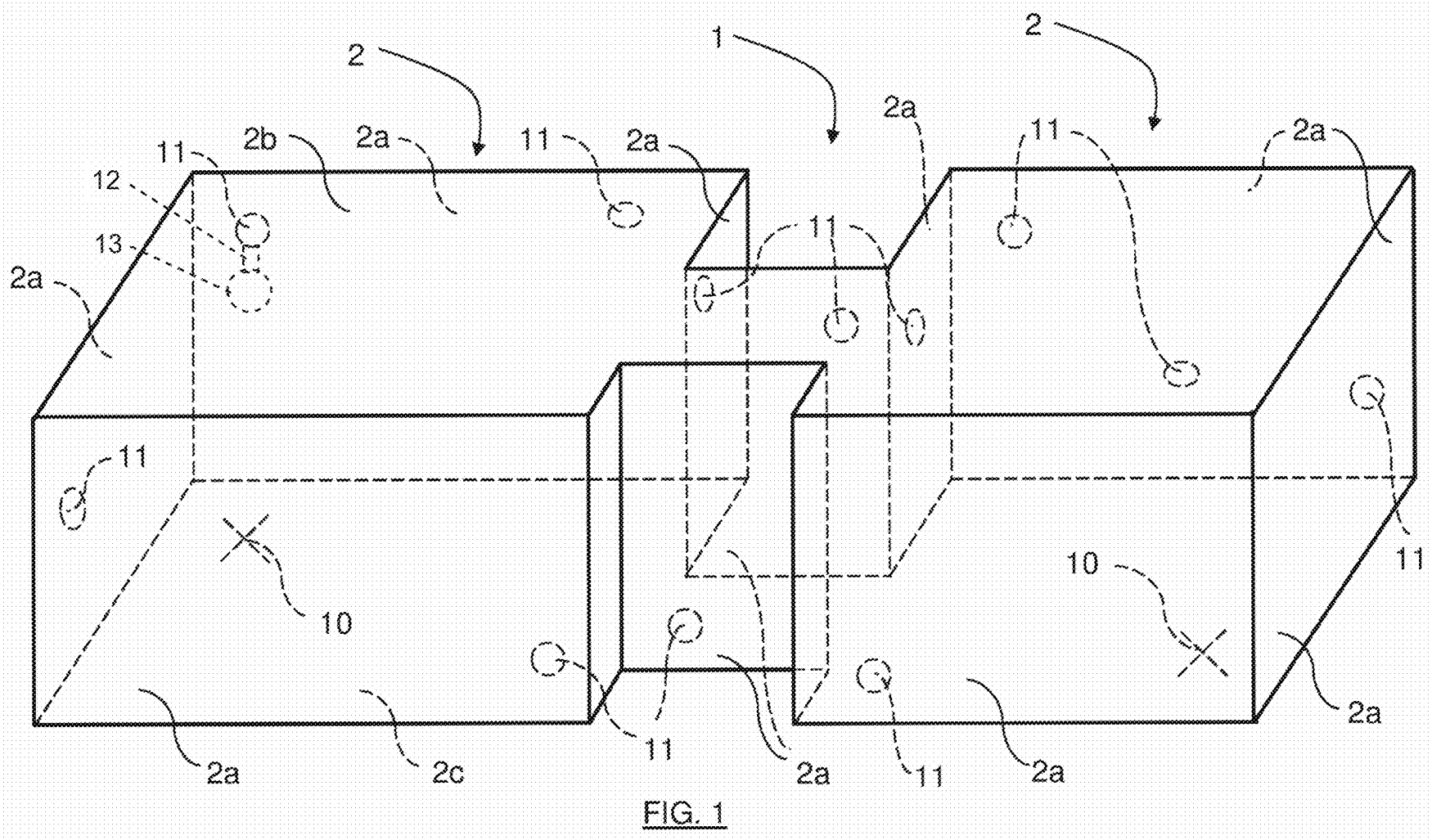
FIG. 1 is a perspective view of a part of a scene comprising scene elements with base members attached thereto.

An embodiment of the method according to the invention will now be described with reference to FIG. 1. The method is employed to generate a 3D combined model that describes temperature variations within a scene 1

The scene 1 comprises two rooms connected by a corridor. The scene comprises a plurality of scene elements 2 in the form of walls 2a, a ceiling 2b and a floor 2c. Additional scene elements in the form of fixed and movable objects (doors, closets, tables etc.) may also be included in the scene 1.

In a first step, a user selects a plurality (in this embodiment two) of reference positions 10 within the scene 1. The reference positions 10 are selected so that each scene element 2 is visible from at least one of the reference positions 10.

Starting from a control point (located outside the scene) with known coordinates in an external geodetic frame the user employs a standard surveying method, e.g. traversing, to determine the coordinates (in three dimensions) of said reference positions 10.

Base members 11 (schematically shown) are mounted on some of the scene elements 2. The base members 11 may be provided with data storage means, in this case RFID members comprising RFID tags, adapted to store data related to the corresponding base members 11 and to communicate said data to an external device, e.g. a smart phone. The base members 11 are preferably evenly distributed within the scene 1 to minimize the margin of error. The user may use a smart phone or any other suitable device to enter data into a database. Each base member 11 has an identification number associated with data relating to said base member 11 in the database. The identification number is stored in the RFID tag connected to the base member 11, so that the user may acquire said data via said RFID tag. The user may, for example, enter data relating to the scene element 2 (type, dimensions, colour etc.) to which the base member 11 is attached.

Thereafter, a surveying apparatus (not shown), e.g. a total station, is positioned at one of the reference positions 10 and a surveying reference member [(not shown)] *13*, e.g. a prism, comprising a surveying means adapted to cooperate with the surveying apparatus is detachably connected to one of the base members 11 visible from that reference position 10. The surveying reference member *13* and the base member 11 comprise first and second connecting portions *12* adapted to interact with one another to ensure that the positional relationship between the surveying reference member *13* and the base member 11 is always the same when the surveying reference member *13* is connected to the base member 11.

Each base member 11 is associated with a respective reference point with a known position in relation to the base member 11. Because the positional relationship between the surveying reference member *13* and the base member 11 is known, the surveying apparatus and surveying reference member *13* can be used to determine the coordinates (in three dimensions) of the reference point in the external geodetic frame. These coordinates are stored in the data base in which they are associated with the identification number of the base member 11. This process is then repeated for every base member 11 visible from the current reference position 10 Alternatively, a plurality of surveying reference members *13* can be attached to the base members 11 before the coordinates of the reference points are determined. The total station is thereafter moved to the other reference position 10 and the coordinates of the reference points associated with the base members 11 visible from that reference position 10 are determined and stored in the database.

Thereafter, a 3D scanner is positioned at a suitable position within the scene and interchangeable first reference members (not shown in FIG. 1) comprising primary means are attached to all base members 11 visible from that position. The 3D scanner generates a 3D primary model comprising a plurality of primary model elements, wherein each primary model element represents a point on a surface of a scene element 2 or a primary means. The 3D scanner is then moved to another position that covers the remaining base members 11 and first reference members comprising primary means are attached to all base members 11 visible from the new position. The 3D scanner then generates another 3D primary model that represents the scene 1 as viewed from the new position.

Figure 2:
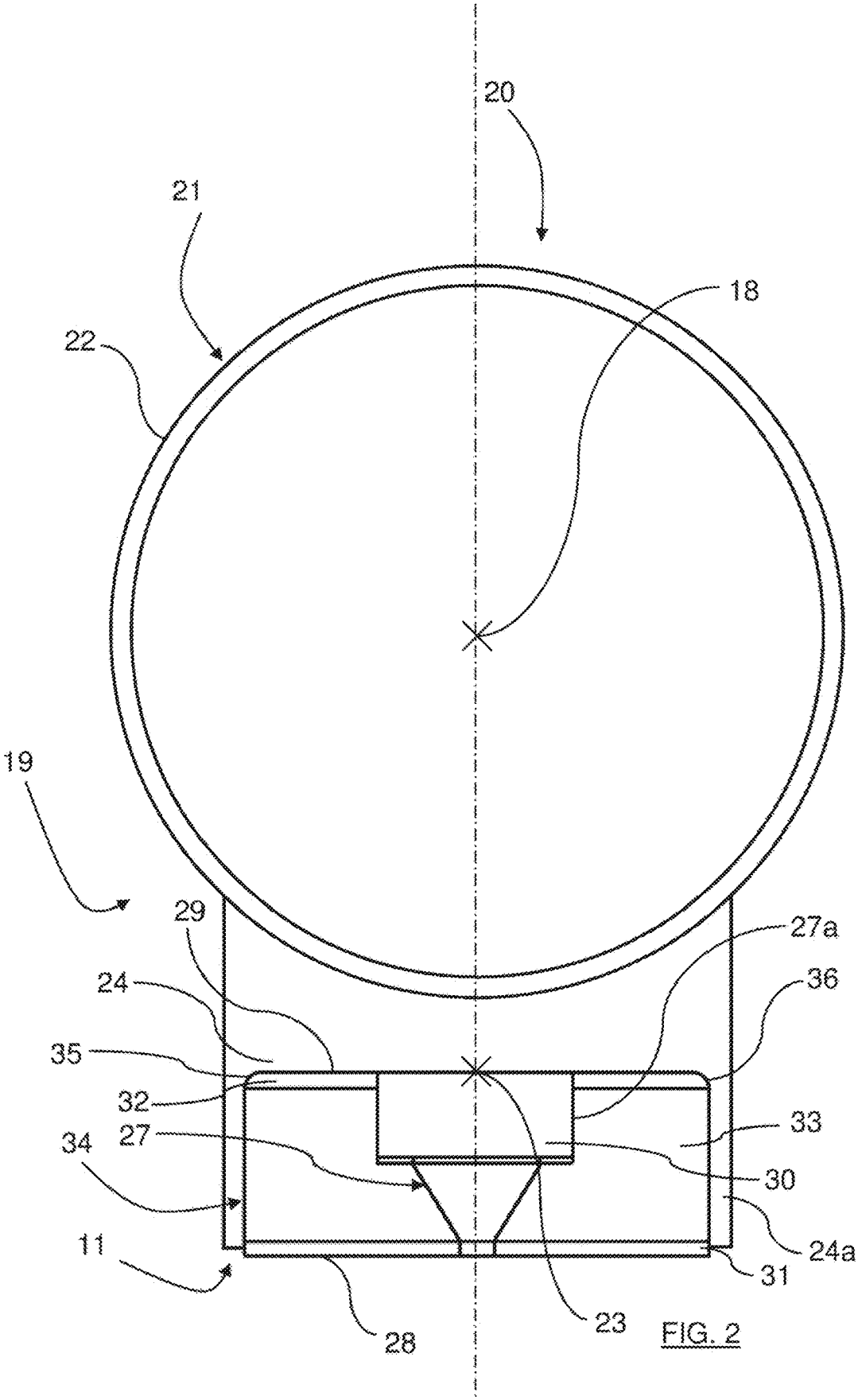
FIG. 2 is a cross-section through a system comprising a first reference member comprising a primary means and a base member.

FIG. 2 shows a cross-section through a first reference member 20 comprising a detectable, primary means 21 adapted to cooperate with a 3D scanner to generate primary model elements in a 3D primary model. The primary means 21 comprises a curved surface 22 that reflects laser signals sent out by the 3D scanner. Each reflected laser signal that is detected by the 3D scanner is associated with a point on the surface 22 of the primary means 21. A corresponding primary model element is created for each point and these primary model elements are associated with the coordinates in a local three-dimensional coordinate system of said points. Thus is created a plurality of primary model elements that represent the surface 22 in the 3D primary model. The appearance of the surface 22 is such that these points are easy to identify within the 3D primary model.

The first reference member 20 comprises a first connecting portion 24 adapted to interact with a second connecting portion 34 on the base member 11 to ensure that the first reference member 20 has a predetermined position in relation to the base member 11. Thus, the positional relationship between the primary detectable means 21 and a base member reference point 23 of the base member 11 is known and this makes it possible for a computer means to determine the coordinates of the base member reference point 23 and a corresponding primary model element may be added to the 3D primary model. This process is repeated for each base member 11 within the scene.

Now returning to FIG. 1, the information gathered by the 3D scanner is processed by a data processing means (not shown). Some reference points are represented in both 3D primary models and this makes it possible to combine the 3D primary models into a single 3D primary model that represents the entire scene 1.

The scene 1 is now represented by a single 3D primary model with known coordinates in the external geodetic frame.

Thereafter, the user positions an apparatus in the form of a thermal imaging camera (not shown) in a suitable position within the scene 1 and attaches second reference members (not shown in FIG. 1) comprising secondary means to the base members 11 visible from the apparatus. The secondary means are adapted to emit thermal radiation to be registered by the apparatus. These second reference members also comprise first connecting portions adapted to interact with second connecting portions on the base members 11 to ensure that the positional relationship between a second reference member and the reference point of its corresponding base member 11 is always the same.

The thermal imaging camera is sequentially positioned in several positions to generate a plurality of 2D secondary models that combined covers the entire scene 1. Each secondary model comprises a plurality of secondary model elements and each secondary model element represents a point associated with a scene element 2 or a secondary means and is assigned a corresponding measured temperature value. Each secondary means has a known temperature and this makes it easy to determine which secondary model elements that represent said second reference members. This information in combination with the fact that the positional relationship between each second reference member and the base member reference point 23 of its corresponding base member 11 is known makes it possible to determine the positions of the reference points of the base members 11 within the secondary models and project these secondary models onto the 3D primary model. The result is a 3D combined model wherein each combined model element is associated with a temperature value as well as coordinates in the local three-dimensional coordinate system and wherein at least some combined model elements have known coordinates in the external geodetic frame.

This final step, as well as other steps involving processing of information acquired from the 3D scanner, a surveying equipment or any other apparatus employed in this method, can be executed by any suitable computing means arranged in direct connection to or at a distance from the 3D scanner and the thermal imaging camera.

Thus is created a 3D combined model that is an accurate 3D representation of the scene and visualizes the varying temperatures within the scene. The 3D combined model also has known coordinates in the external geodetic frame.

An authorized user may now use a hand held device, e.g. a smart phone, to access the data stored in the database, e.g. via the RFID tag in the RFID member, and acquire a 3D image of the entire scene 1 (or part of the scene 1). It is, of course, also possible to acquire information directly from the database.

Note that 3D primary and secondary models usually do not have the same resolution. One solution to this problem is to interpolate the measured secondary physical property values and compute and assign corresponding values to each primary model element in the 3D primary model, which then becomes a 3D combined model. It is also possible to reconstruct the models and create a new 3D combined model wherein each combined model element has a measured or computed temperature value and measured or computed coordinates in the local three-dimensional coordinate system.

The skilled person understands that the above described method can be modified in many ways without departing from the scope of the invention. For example, the measuring of the temperature can be carried out before the 3D scanning and the primary model elements corresponding to the surface of the primary means can be used to combine the various 3D primary models instead of first determining the positions of the reference points.

Now returning to FIG. 2, the first reference member 20 and the base member 11 form part of a system 19 comprising a plurality of base members 11 and first reference members 20.

This particular base member 11 is described in detail in patent application SE 1530070-0, which is hereby incorporated in its entirety into this application.

The base member 11 has the shape of a circular washer with a central hole 27 for a fastening member, e.g. a screw, for fastening the base member 11 to a scene element. The base member 11 has a flat first surface 28, which is intended to face the scene element, and a flat second surface 29, which extends in parallel with the first surface 28 and is intended to face the first reference member 20. The reference point 23 of the base member 11 is in this embodiment located at the centre of the second surface 29 of the base member 11.

The hole 27 further comprises a cavity 27a, adapted to receive a data storage means 30 in the form of an RFID member comprising an RFID tag.

The base member 11 comprises a first protective layer 31, which defines the first surface 28, a second protective layer 32, which defines the second surface 29, and a core 33 located between the first and second protective layers 31, 32. The protective layers 31, 32 are made of a suitable protective material, e.g. zinc, and the core 33 is at least partly made of a magnetic material, e.g. iron. The base member 11 can also be designed of a materiel that is self-protecting, i.e. it does not use a protective layer, like stainless steel, in this case preferably magnetic. The second protective layer 32 and the core 33 define a second connecting portion 34 adapted to be connected to the first reference member 20. The first reference member 20 comprises a corresponding first connecting portion 24 comprising a cylindrical wall 24a adapted to encompass the second connecting portion 34 of the base member 11. That is, the second protective layer 32 and a part of the core 33 of the base member 11 are received within a space defined by the first connecting portion 24 of the first reference member 20. An outer rim 35 of the second protective layer 32 has a curvature adapted to cooperate with a corresponding curved surface 36 on the first connecting portion 24 to ensure that the first reference member 20 assumes the same position in relation to the base member 11 every time it is connected to any base member 11. Other first reference members are provided with identical first connecting portions and thus can be assured that the positional relationship between a first reference member 20 and a base member reference point 23 of the base member 11 is the same for all first reference members 20 of this type when attached to any base member 11.

Note that the first reference member 20 in FIG. 2 is symmetrical, that is, the first reference member 20 can be rotated about its longitudinal axis without changing the overall shape and without changing the space position of a primary detectable means reference point 18 of the primary means 21, said primary detectable means reference point 18 being located at the centre point of the primary detectable primary means 21. Alternatively, the first and second connecting portions of the base member and the first reference member can be provided with stop members adapted to interact to ensure that the first reference member 20 is fixed in a predetermined position relative the base member 11.

Suitably, at least a part of the core 33 is made of a magnetic material so that it is adapted to create a magnetic connection with a magnet (not shown) in the first reference member 20.

Figure 3:
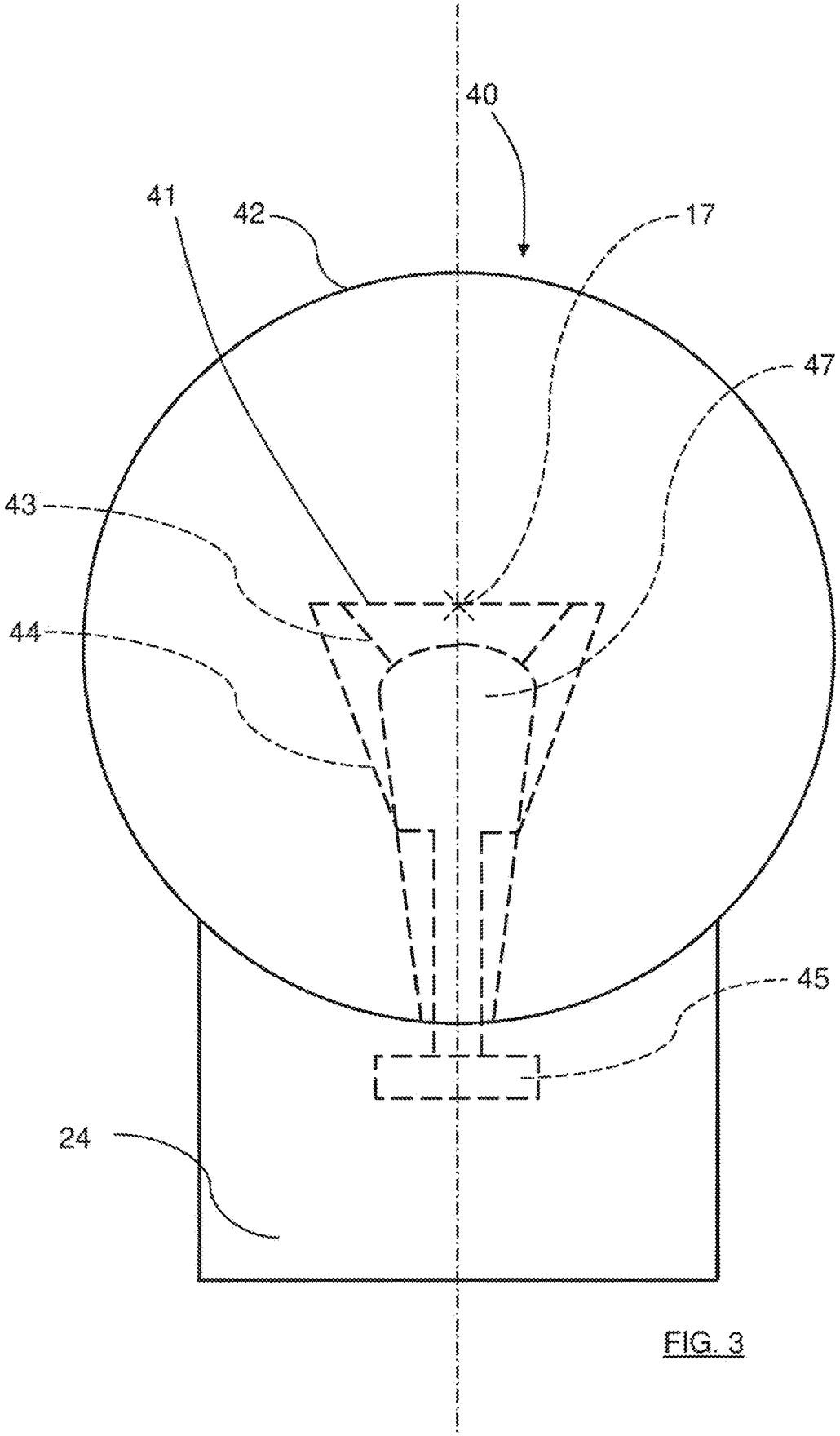
FIG. 3 is a side-view of a second reference member comprising a secondary means.

FIG. 3 shows a side view of a second reference member 40, different from the first reference member 20, adapted to cooperate with a thermal imaging camera as described above with reference to FIG. 1. The system 19 described with reference to FIG. 2 may comprise any suitable number of these second reference members 40.

The second reference member 40 comprises a detectable, secondary means 41 adapted to emit thermal radiation. The secondary means 41 is a first filament arrangement within a glass bulb 42, the glass bulb being shaped as a sphere, filled with a low pressure inert gas. The secondary means 41 is connected to a stem 47 by a pair of support wires 43 and to a source of electricity 45 by a pair of contact wires 44. An electrical current is passed through the secondary means 41 and electrical resistance causes the temperature of the secondary means 41 to rise. The secondary means 41 emits thermal radiation with certain characteristics, like certain wavelength(s), which is detected by the thermal imaging camera.

A first connecting portion 24 of the second reference member 40 is similar to the first connecting portion 24 of the first reference member 20 in FIG. 2. Thus is ensured that the first and second reference members 20, 40 are connected to the base member 11 in the same way.

Advantageously, the second reference member 40 has the same outer dimensions as the first reference member 20, and the secondary means 41 has a position at a centre point of the glass bulb 42, the centre point being in a position that corresponds to the centre point of the primary means 21 in the first reference member 20. The filament of the secondary means 41 can advantageously be visually divided into two parts of equal length by the centre point of the glass bulb 42.

Note that the orientation of the secondary means 41 may change during use because the second reference member 40 may be rotated about its longitudinal axis. There still exists a predetermined positional relationship between the secondary means 41 and the base member because a secondary means reference point 17, which is located on the longitudinal axis of the second reference member 40, has a fixed positional relationship in relation to the base member.

Figure 4:
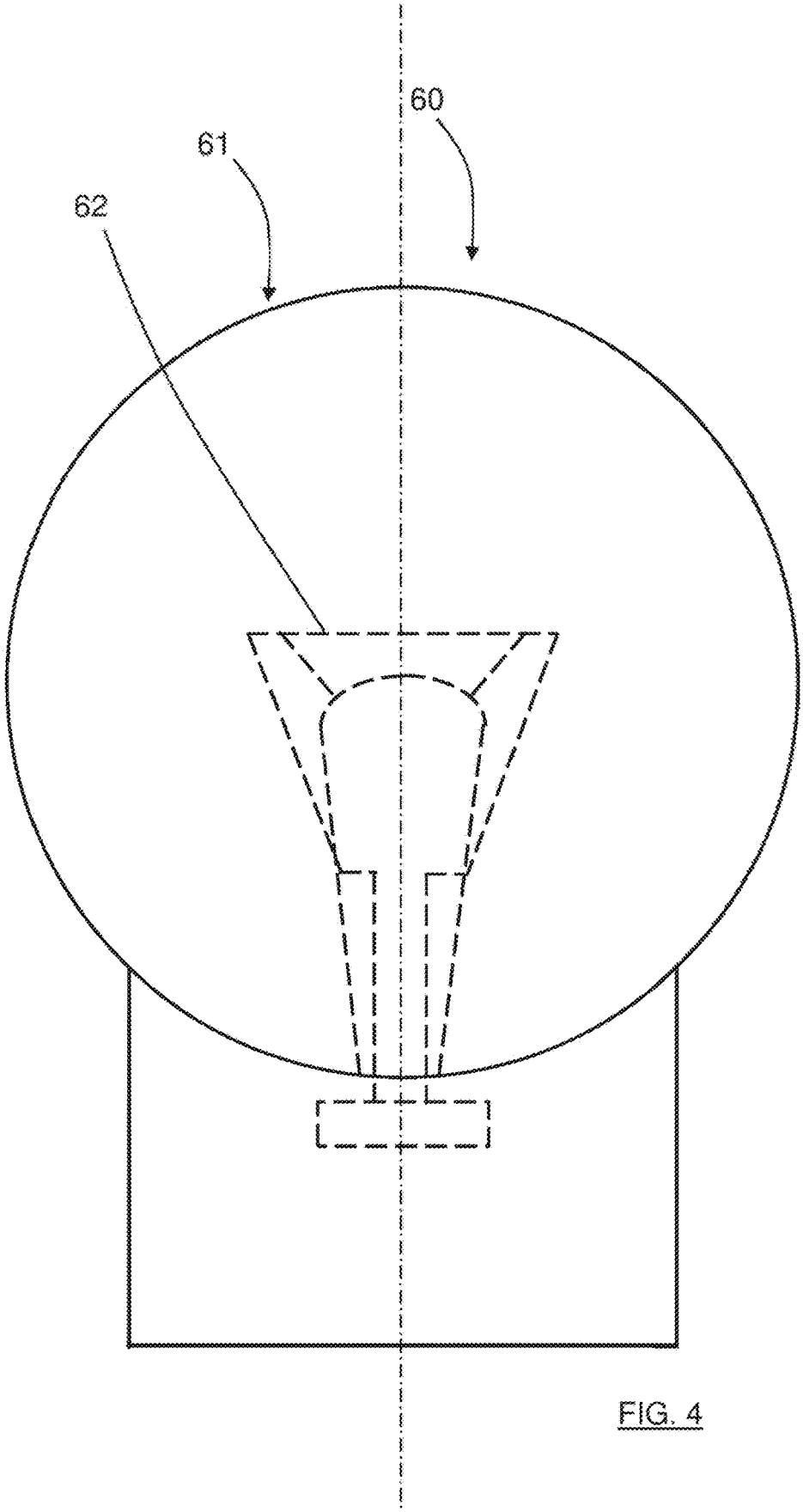
FIG. 4 is a side-view of an alternative embodiment of a first reference member comprising a primary means and a secondary means.

FIG. 4 shows an alternative embodiment in the form of a third reference member 60, a combination in part from the first and second reference members 20 and 40, which third reference member 60 has an outer shape that is mainly identical to the one of the first reference member 20 in FIG. 2 and the second reference member 40 of FIG. 3. The third reference member 60 includes a second means, which is a filament arrangement 62 like the first filament arrangement 41 of the second reference member 40, positioned in an alternative third means 61, which is a more specified first means 21 when it comes to physical properties, more explained below. The combination thus shows both a first and second means 21 and 41, respectively. The alternative first means 61 is similar but not necessarily exactly the same as the first means 21. The alternative first means 61 of the third reference member 60, which suitably is similar in shape to the second means 42 of FIG. 3, is made of a material that has the physical properties of on the one hand being able to reflect light wavelengths visual to a 3D scanner, like the first means 21, and on the other hand being able to let through light wavelengths emitted by the filament arrangement 62, this light being detectable by a thermal imaging camera.

The advantage of the third reference member 60 in FIG. 4 is that it can perform the tasks of both first reference member 20 and second reference member 40, i.e. does not have to be replaced with a second reference member after the step of acquiring a primary model and before the step of acquiring a secondary model of the thermal type.

The invention is not limited to the above described embodiments and the embodiments described herein can be modified and combined in many different ways without departing from the scope of the invention. For example, the primary means in FIGS. 2 and 4 may have any suitable and recognizable appearance (a sphere, a corner-cube, a plane or a checker board). It is also possible to execute the steps of the method in a different order and it is in some cases, when base members have been previously attached to the scene elements and the coordinates of the reference points of the base members are known, possible to skip the corresponding steps of the method.

The invention claimed is:

1. Method for generating a 3D combined model that represents a scene (1), in which scene (1) base members (11) are attached to scene elements (2) and wherein each base member (11) is associated with a respective reference point (23), which method comprises the steps of:

acquiring the coordinates in [an external geodetic frame of] *a coordinate system for each of* said reference points (23);

detachably connecting [first] reference members [(20)] (*60*), comprising [primary means (21)] *an emitter or reflector* (*61*) *adapted to provide at least one type of primary physical property value and a filament arrangement* (*62*) *adapted to provide a predetermined temperature value*, to said base members (11) in predetermined positional relationships;

acquiring at least one 3D primary model that represents the scene (1), which 3D primary model comprises a plurality of primary model elements, some of which represent points on the scene elements (2) and some of which represent points on said [primary means (21)] *emitter or reflector* (*61*), wherein each primary model element is assigned [measured] *the provided* primary physical property values in the form of coordinates in a local three-dimensional coordinate system of the corresponding point;

wherein the method comprises the steps of:

acquiring at least one secondary model that represents the scene (1), which secondary model comprises a plurality of secondary model elements, some of which represent points associated with scene elements (2) and some of which represent points associated with [secondary means] *the filament arrangement* ([41;]62), connected to said base members (11) in predetermined positional relationships, wherein each secondary model element is associated with [at least one measured secondary physical property value] *the predetermined temperature value* associated with the corresponding point; *and* processing the acquired [information] *coordinates and models* to generate a 3D combined model that represents the scene (1), wherein at least some combined model elements are associated with known coordinates in the [external geodetic frame] *coordinate system*, and wherein at least some combined model elements are associated with both [first and second measured] *the provided primary* physical property values *and predetermined temperature values*.

2. Method according to claim 1, which method comprises the step of acquiring additional secondary models associated with [different] *at least one* secondary physical [properties] *property*.

[3. Method according to claim 1, further comprising the step of replacing some first reference members (20) with second reference members (40) comprising secondary means (41) before a secondary model is acquired.]

[4. Method according to claim 1, wherein said first reference members (20) comprise said secondary means (62).]

5. Method according to claim 1, which method comprises the steps of:

detachably connecting one or more surveying reference members comprising [surveying means for use with surveying equipment] *a prism or reflector* (*13*) to at least two base members (11) in predetermined positional relationships;

acquiring the coordinates in the [external geodetic frame ] *coordinate system for each* of the reference points (23) associated with said base members (11) by means of [said] surveying equipment and said one or more surveying reference members.

6. Method according to claim 1, which method further comprises the step of attaching the base members (11) to the scene elements (2).

7. Method according to claim [1] *2*, wherein *the* at least one secondary physical property is one of the following: colour, frequency, luminescence, magnetic field, reflectivity, temperature and volume.

8. System for use in a method for generating a 3D combined model that represents a scene (1) according to claim 1, which system comprises:

a plurality of base members (11), wherein each base member (11) defines a reference point (23), which base members (11) are adapted to be connected to scene elements (2);

a plurality of reference members ([20;]60) each comprising a first connecting portion (24) adapted to cooperate with a second connecting portion (34) of a base member (11) to detachably connect the reference member ([20;]60) to said base member (11) in a predetermined positional relationship, wherein each reference member ([20;]60) comprises [a primary means] *an emitter or reflector* ([21;]61) with a recognizable appearance; *and*

[wherein said system further comprises secondary means (41; 62), adapted to provide at least one recognizable secondary physical property value, which secondary means (41; 62) are adapted to be connected to said base members (11) in predetermined positional relationships] *a filament arrangement* (*62*), *adapted to provide a predetermined temperature value*.

[9. System according to claim 8, wherein at least one first reference member (60) comprises a secondary means (62).]

[10. System according to claim 8, which system comprises second reference members (40) each comprising a first connecting portion (24) adapted to cooperate with the second connecting portion (34) of the base member (11) to detachably connect the second reference member (40) to the base member (11) in a predetermined positional relationship, wherein each second reference member (40) comprises a secondary detectable means (41).]

11. System according to claim 8, wherein the second connecting portion (34) of the base member (11) is adapted to cooperate with a first connecting portion of a surveying reference member, which surveying reference member comprises a [surveying means adapted to cooperate with surveying equipment] *prism or reflector* (*13*), to detachably connect said surveying reference member to the base member (11) in a predetermined positional relationship, which [surveying means] *prism or reflector* (*13*) can be used to determine the coordinates in [an external geodetic frame of the] *a coordinate system for each* reference point (23) of the base [member] *members* (11).

12. Reference member (60) for use in a system according to claim 8, which reference member (60) comprises a first connecting portion (24) adapted to cooperate with a second connecting portion (34) of a base member (11) to detachably connect the reference member (60) to the base member (11) in a predetermined positional relationship, and [a primary means] *an emitter or reflector* (61) with a recognizable appearance, wherein said reference member (60) comprises a [secondary means] *filament arrangement* (62) adapted to provide [at least one type of secondary physical property value] *a predetermined temperature value*.

[13. Method according to claim 2, further comprising the step of replacing some first reference members (20) with second reference members (40) comprising secondary means (41) before a secondary model is acquired.]

[14. Method according to claim 2, wherein said first reference members (20) comprise said secondary means (62).]

15. Method according to claim 2, which method comprises the steps of:

detachably connecting one or more surveying reference members comprising [surveying means for use with surveying equipment] *a prism or reflector* (*13*) to at least two base members (11) in predetermined positional relationships;

acquiring the coordinates in the [external geodetic frame] *coordinate system for each* of the reference points (23) associated with said base members (11) by means of [said] surveying equipment and said one or more surveying reference members.

[16. Method according to claim 3, which method comprises the steps of:

detachably connecting one or more surveying reference members comprising surveying means for use with surveying equipment to at least two base members (11) in predetermined positional relationships;

acquiring the coordinates in the external geodetic frame of the reference points (23) associated with said base members (11) by means of said surveying equipment and said one or more surveying reference members.]

[17. Method according to claim 4, which method comprises the steps of:

detachably connecting one or more surveying reference members comprising surveying means for use with surveying equipment to at least two base members (11) in predetermined positional relationships;

acquiring the coordinates in the external geodetic frame of the reference points (23) associated with said base members (11) by means of said surveying equipment and said one or more surveying reference members.]

18. Method according to claim 2, which method further comprises the step of attaching the base members (11) to the scene elements (2).

[19. Method according to claim 3, which method further comprises the step of attaching the base members (11) to the scene elements (2).]

[20. Method according to claim 4, which method further comprises the step of attaching the base members (11) to the scene elements (2).]

*21. Method according to claim 1, wherein the filament arrangement configured to emit thermal radiation.*

* * * * *